(12) United States Patent
Merlo (10) Patent No.: US 11,873,940 B2
(45) Date of Patent: Jan. 16, 2024

(54) CURED IN PLACE PIPE SYSTEM HAVING A SENSOR

(71) Applicant: Stephen A. Merlo, St. Louis, MO (US)

(72) Inventor: Stephen A. Merlo, St. Louis, MO (US)

(*) Notice: Subject to any disclaimer, the term of this patent is extended or adjusted under 35 U.S.C. 154(b) by 662 days.

(21) Appl. No.: 17/089,351

(22) Filed: Nov. 4, 2020

(65) Prior Publication Data

US 2022/0136635 A1    May 5, 2022

(51) Int. Cl.
| | | |
|---|---|---|
| *F16L 55/16* | (2006.01) |
| *F16L 55/165* | (2006.01) |
| *G01F 23/00* | (2022.01) |
| *H04N 7/18* | (2006.01) |
| *G01F 15/063* | (2022.01) |
| *G01F 15/18* | (2006.01) |

(52) U.S. Cl.
CPC ........ *F16L 55/1652* (2013.01); *G01F 15/063* (2013.01); *G01F 15/18* (2013.01); *G01F 23/00* (2013.01); *H04N 7/181* (2013.01)

(58) Field of Classification Search
CPC .............................. F16L 55/1652; G01F 5/063
USPC ................ 138/97, 98, 104; 405/150.1, 184.2
See application file for complete search history.

(56) References Cited

U.S. PATENT DOCUMENTS

| | | | | |
|---|---|---|---|---|
| 5,172,730 A | * | 12/1992 | Driver ..................... | G01M 3/18 138/104 |
| 5,423,630 A | * | 6/1995 | Imoto ................... | F16L 55/163 405/184.2 |
| 6,305,427 B1 | * | 10/2001 | Priest ...................... | F16L 11/12 138/104 |
| 8,636,869 B2 | | 1/2014 | Wiessner et al. | |
| 9,651,189 B2 | | 5/2017 | Karunakaran et al. | |
| 2012/0175005 A1 | * | 7/2012 | Andersen ................ | F16L 57/06 138/104 |
| 2014/0027000 A1 | * | 1/2014 | Kiest, Jr. ................... | F16L 9/14 138/97 |
| 2015/0034198 A1 | * | 2/2015 | Cheatham, III ...... | F16L 55/163 138/97 |
| 2016/0033073 A1 | | 2/2016 | Hairston et al. | |
| 2016/0061374 A1 | * | 3/2016 | Bichler ................. | F16L 55/265 138/97 |
| 2018/0305521 A1 | | 10/2018 | Hazen et al. | |

* cited by examiner

*Primary Examiner* — James F Hook
(74) *Attorney, Agent, or Firm* — David H. Chervitz (57) ABSTRACT

A cured in place pipe system having a sensor has a cured in place pipe having a seam, a sensor incorporated into the seam, the sensor for transmitting a signal indicative of a condition within the cured in place pipe, and a communications device positioned remote from the sensor and capable of receiving the signal from the sensor.

20 Claims, 7 Drawing Sheets

CURED IN PLACE PIPE SYSTEM HAVING A SENSOR

BACKGROUND

This disclosure relates generally to a cured in place pipe system, and more particularly to a cured in place pipe system having a sensor for monitoring or sensing an environmental condition within a pipe system.

Sewer lines are used to move raw sewage and waste water from a house or a commercial site to a waste water treatment plant to be processed before the treated water is provided to a water source. Although the sewer lines are designed to convey only waste water it is known that ground or storm water may infiltrate the sewer lines through defects, cracks, or holes. The ground or storm water may cause backup problems within a structure. Further, when leaking sewer lines allow infiltration of ground water into the sewer lines, soil particles may be suspended in the ground water and flow into the sewer line, leaving voids in the soil where the soil particles eroded. The erosion leads to the sewer line not being supported in the ground and the sewer line being broken. These defects can cause other problems such as potholes, sinkholes, collapse of streets and buildings. As can be appreciated, all of this should be avoided.

In an effort to fix lines or pipes that have developed defects, cracks, or holes, various inline rehabilitation methods, devices, and systems have been proposed and implemented. One method is a cured in place method that has become popular because it avoids any excavation or damage to streets, buildings, or grounds. In particular, the cured in place method is used to line a damaged or broken pipe with an initially flexible liner that is cured to become a hardened pipe. Typically the damaged pipe is an underground main sewer pipe, a lateral sewer pipe, a water pipe, a drain pipe, or a gas pipe. The liner consists of a fabric that is saturated with an uncured thermoset material or resin. Heat or a light source may be used to cure the thermoset material to transform the flexible fabric into a hardened material that conforms to the inside of the damaged pipe. In this manner the cured in place liner becomes a pipe within the damaged pipe. There are a few methods of installing the cured in place line within a pipe or a conduit. One method may consist of an inversion installation method or process in which the flexible liner is inverted within a pipe or conduit to be rehabilitated. Once the flexible liner has been inserted, the liner is inflated to push or press the resin side of the liner against the pipe. The thermoset composition or resin impregnated in the flexible liner is hardened, such as by heat, steam, or light. Once hardened, the liner will conform to the shape of the pipe to provide a new continuous pipe without any voids or cracks. The hardened liner is resistant to abrasion, corrosion, or chemicals that may flow through the liner. Another installation method, known as the pulled-in-place installation, consists of pulling a resin impregnated fabric tube into a pipe, inflating the tube, and then curing the tube. The cured in place pipe may be used in various gravity and pressure applications such as municipal sewer systems, storm sewer systems, electrical conduits, ventilation systems, vent pipes, roof drain pipes, waste stacks, floor drains, clean out tees, house traps, wye/tee drop connections, and manholes.

Although the cured in place pipe liner is useful in renovating or rehabilitating pipes, the liner does not provide any other benefit. In particular, there is no way to know what is flowing through the liner, what quantity of fluid is flowing through the liner, or the level of fluid that is within the liner. For various reasons, it would be beneficial at times to know what is flowing through the liner, what quantity of fluid is flowing through the liner, or what the level of fluid is within the liner. Further, if infiltration or inflow exists then it is important to be able to find the source of infiltration or inflow to correct the problem. Typically, this requires a crew to travel to the potential source and to survey the situation. Manholes, pipes, trunks, and connections need to be visually inspected by sending a camera through the sewer system to locate the defect. Once detected, the defect needs to be repaired or corrected. Also, some problems are only intermittent such as after a storm. In this case, a crew may not be dispatched in time to exam the situation.

The present disclosure of a cured in place pipe system having a sensor is designed to obviate and overcome many of the disadvantages and shortcomings zeroing in on a problem situation. Moreover, the present disclosure is related to a cured in place pipe system having a sensor that is capable of detecting what is flowing through the pipe, fluid flow rate within the pipe, and the level of fluid within the pipe. The cured in place pipe system having a sensor of the present disclosure is also utilized to detect water flow within residential or commercial piping systems. Further, the cured in place pipe system having a sensor provides signals indicative of what is flowing through the pipe, fluid flow rate within the pipe, or the level of fluid within the pipe to a remote location so that an operator can be informed of what is in the pipe or so that the operator can respond to a situation. Also, the cured in place pipe system having a sensor may be employed to detect water flow and to generate a signal indicative of water flow to be provided to a remote location for recording, billing, auditing purposes.

SUMMARY

In one form of the present disclosure, a cured in place pipe system having a sensor is disclosed which comprises a cured in place pipe having a seam, a sensor incorporated into the seam, the sensor for transmitting a signal indicative of a condition within the cured in place pipe, and a communications device positioned remote from the sensor and capable of receiving a signal from the sensor.

In another form of the present disclosure, a cured in place pipe system having a sensor is disclosed which comprises a cured in place pipe having a seam, a first sensor incorporated into the seam, the first sensor for transmitting a first signal indicative of a first condition within the cured in place pipe, a second sensor incorporated into the seam, the second sensor for transmitting a second signal indicative of a second condition within the cured in place pipe, and a communications device positioned remote from the sensor and capable of receiving the first signal from the first sensor and the second signal from the second sensor.

In yet another form of the present disclosure, a cured in place pipe system having a sensor is disclosed which comprises a cured in place pipe having a seam, a sensor positioned along the seam, the sensor for transmitting a signal indicative of a condition within the cured in place pipe, and a communications device positioned remote from the sensor and capable of receiving the signal from the sensor.

The present disclosure provides a cured in place pipe system having a sensor that may be used to detect any damage associated with a sewer line backup.

The present disclosure provides a cured in place pipe system having a sensor that does not require any operator intervention to detect any sewer line backup.

The present disclosure provides a cured in place pipe system having a sensor that may alert an individual or an operator of a water backup condition with the individual or the operator being located at a location remote from a residence or commercial site where the system is installed.

The present disclosure is directed to a cured in place pipe system having a sensor that assists in reducing or preventing any damage associated with water backup from a sewer line.

The present disclosure also provides a cured in place pipe system having a sensor that may be easily employed with highly reliable results in detecting various conditions within a sewer line or a pipe.

The present disclosure further provides a cured in place pipe system having a sensor that is sturdy and capable of withstanding extended use in a harsh environment such as a sewer line.

The present disclosure provides a cured in place pipe system having a sensor that can be constructed using readily available materials and easily manufactured components.

The present disclosure also provides a cured in place pipe system having a sensor that may be used with existing sewer lines and does not require retrofitting existing sewer lines.

The present disclosure is also directed to a cured in place pipe system having a sensor that may be installed in existing pipes, such as sewer lines, to detect various environmental conditions with the existing pipes.

The present disclosure is further directed to a cured in place pipe system having a sensor that may be installed in residential systems and in commercial systems.

These and other advantages of the present disclosure will become apparent after considering the following detailed specification in conjunction with the accompanying drawings, wherein:

DETAILED DESCRIPTION OF A PREFERRED EMBODIMENT

Figure 1:
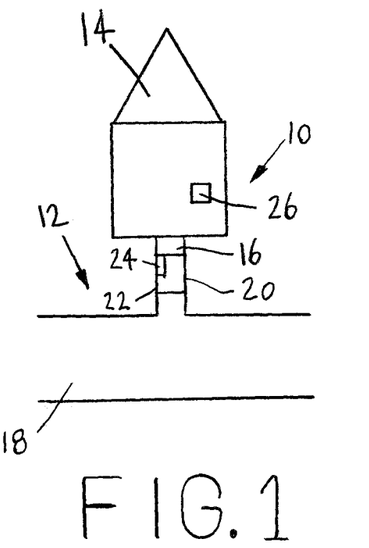
FIG. 1 is a schematic block diagram view of houses being connected to a sewage system with one of the houses having a cured in place pipe system having a sensor constructed according to the present disclosure installed therein.

Referring now to the drawings, wherein like numbers refer to like items, number 10 identifies a preferred embodiment of a cured in place pipe system having a sensor constructed according to the present disclosure. With reference now to FIG. 1, the cured in place pipe system having a sensor 10 is shown being installed in a sewage system 12 that is servicing a house 14 that has a drain pipe 16 that is connected to a main pipe 18 of the sewage system 12. The system 10 comprises a cured in place pipe 20 having a seam 22 and a sensor 24 being incorporated into the seam 22. A communications device 26 is positioned or located away from the sensor 24 and is capable of transmitting a signal to the sensor 24 and receiving a signal from the sensor 24. The communications device 26 is shown being inside of the house 14. The pipe 20 having the seam 22 and the sensor 24 are inserted into and positioned within the drain pipe 16. The method or procedure for inserting the pipe 20 into the drain pipe 16 will be detailed more further herein. Further, it is contemplated that the pipe 20 may be a small section or portion that would not span the entire length of the drain pipe 16. The sensor 24 is used to monitor various conditions associated with water, fluid, or sewage flowing through the drain pipe 16 and the main pipe 18. For example, the sensor 24 may be used to monitor water or sewage that flows out of the house 14 to be used by a sewage company for billing purposes. The sensor 24 may also be used to sense a water backup or sewage backup condition in the house 14. During a rain storm rain water produced by the storm may enter the sewage system 12. Water may infiltrate the system 12 through leaks in the drain pipe 16 or the main pipe 18. Storm water may flow into the sewage system 12 from roof downspouts, groundwater sump pumps, and street and driveway drains. If the sewage system 12 is not of a sufficient size then water from a heavy rainstorm will be sent back up the drain pipe 16 and into the house 14. This can cause water damage to within the house 14. The communications device 26 may send and receive other signals to and from other devices (not shown), as will be discussed further herein.

Figure 2:
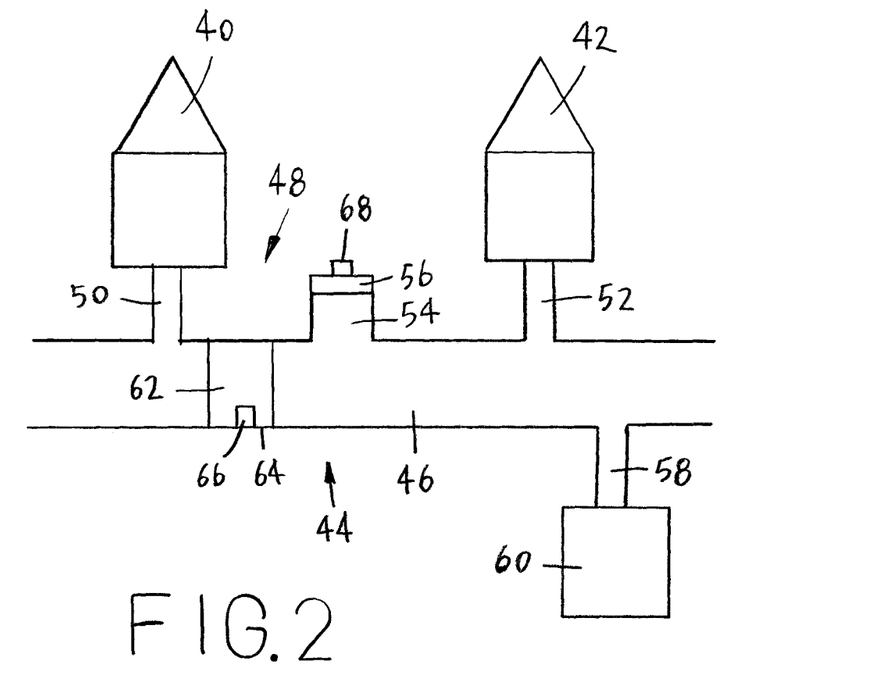
FIG. 2 is a schematic block diagram view of houses being connected to a sewage system with a main pipe of the sewage system having a cured in place pipe system having a sensor constructed according to the present disclosure installed therein.

FIG. 2 is a schematic block diagram view of two houses 40 and 42 being connected to a sewage system 44 with a main pipe or a main sewer line 46 of the sewage system 44 having a cured in place pipe system having a sensor 48 constructed according to the present disclosure. The house 40 has a drain pipe or sewer line 50 connected to the main pipe 46. The house 42 also has a drain pipe or sewer line 52 connected to the main pipe 46. The main pipe 46 has a manhole or access shaft 54 having a manhole cover 56. The manhole 54 is used to allow access to the main pipe 46. The main pipe 46 branches off at a sewer line 58 that is connected to a treatment plant 60. Any waste water or sewage that makes its way to the treatment plant 60 is treated before being sent to a water source, such as a river. The drain lines 50 and 52, the main pipe 46, the manhole 54, the sewer line 58, and the treatment plant 60 all form the sewage system 44. The cured in place pipe system 48 comprises a cured in place pipe 62 having a seam 64 and a sensor 66 being incorporated into the seam 64. A communications device 68 is positioned or located away from the sensor 66 and is capable of transmitting a signal to the sensor 66 and receiving a signal from the sensor 66. The communications device 68 is shown being positioned on the manhole cover 56. The pipe 62 having the seam 64 and the sensor 66 are inserted into and positioned within the main pipe 46. The sensor 66 is used to monitor various conditions associated with water, fluid, or sewage flowing through the main pipe 46. The system 48 is used to monitor conditions within the main pipe 46 as opposed to the system 10 which is used to monitor conditions within the drain pipe 16 (FIG. 1). Further, the system 48 is capable of being positioned or placed in the main pipe 46 that does not need to be rehabilitated. In particular, the system 48 is used to retrofit the existing main pipe 46 to be able to monitor or sense various conditions within the main pipe 46.

Figure 3:
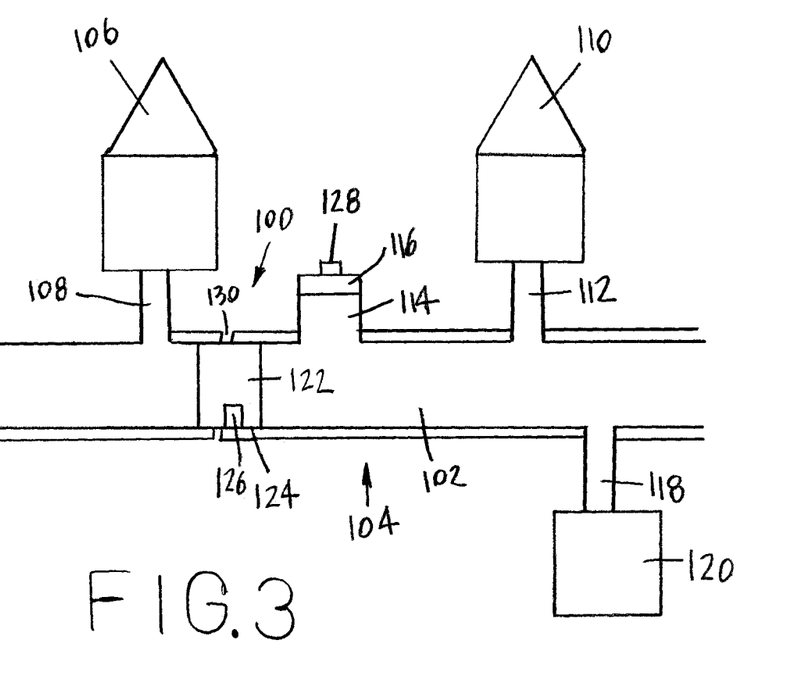
FIG. 3 is a schematic block diagram view of houses being connected to a sewage system with a main pipe having a void and a cured in place pipe system having a sensor constructed according to the present disclosure installed therein.

With reference now to FIG. 3, another embodiment of a cured in place pipe system having a sensor 100 is illustrated. The cured in place pipe system having a sensor 100 is installed in a main pipe 102 of a sewage system 104. A first house 106 is connected to the main pipe 102 by a drain pipe 108. A second house 110 is also connected to the main pipe 102 by a drain pipe 112. The main pipe 102 also has a manhole 114 having a manhole cover 116. The main pipe 102 branches off at a sewer line 118 that is connected to a treatment plant 120. Any waste water or sewage that makes its way to the treatment plant 120 is treated before being sent to a water source. The cured in place pipe system 100 comprises a cured in place pipe 122 having a seam 124 and a sensor 126 being incorporated into the seam 124. A communications device 128 is positioned or located away from the sensor 126 and is capable of transmitting a signal to the sensor 126 and receiving a signal from the sensor 126. The communications device 128 is shown being positioned on the manhole cover 116. The pipe 122 having the seam 124 and the sensor 126 are inserted into and positioned within the main pipe 102. The sensor 126 is used to monitor various conditions associated with water, fluid, or sewage flowing through the main pipe 102. The main pipe 102 is broken and has a crack or void 130 and the cured in place pipe 122 is used to rehabilitate or fix the crack 130. The system 100 is used to monitor conditions within the main pipe 102. Further, the system 100 is capable of being positioned or placed in the main pipe 102 that needs to be rehabilitated or fixed.

Figure 4:
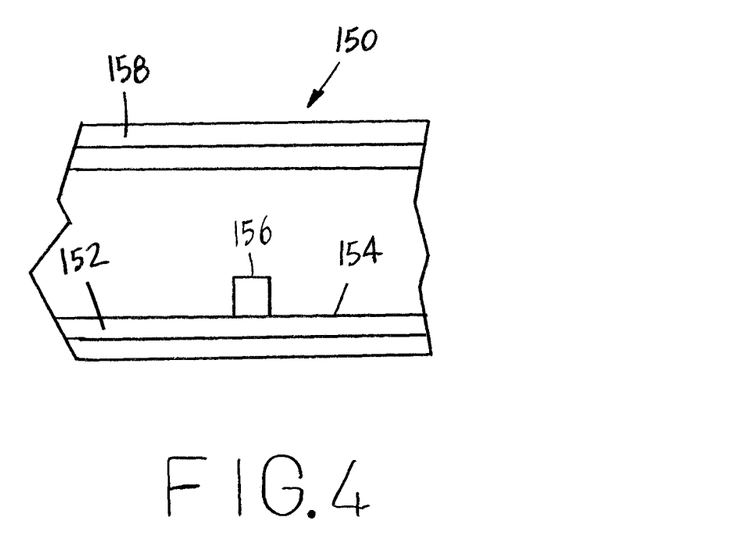
FIG. 4 is a partial enlarged schematic block diagram of another embodiment of a cured in place pipe system having a sensor constructed according to the present disclosure.

FIG. 4 is a partial enlarged schematic block diagram of another embodiment of a cured in place pipe system having a sensor 150 constructed according to the present disclosure. The system 150 comprises a cured in place pipe or liner 152 having a seam 154 and a sensor 156 being incorporated into the seam 154. The pipe 152 is adjacent to a main or drain pipe 158. This ensures that any fluid or sewage that passes by the sensor 156 will be detected. As previously indicated, the pipe 152 initially consists of a fabric material that is saturated with an uncured thermoset material or resin. Heat or a light source may be used to cure the thermoset material to transform the flexible fabric into a hardened material that conforms to the inside of the main or drain pipe 158. In this manner the cured in place liner becomes the pipe 152 within the main or drain pipe 158. By way of example only, the sensor 156 may be a submersible level sensing transmitter device, such as the ProSense SLT series devices manufactured by Automation Direct of Cumming, Georgia. The sensor 156 may also be, again by way of example only, a camera such as manufactured by Blink or Deep Trekker. The sensor 156 may further be a flow meter, such as manufactured by Badger Meter of Milwaukee, Wisconsin. The sensor 156 may be used to detect or sense the level of water or sewage within the pipe 152, the visual interior of the pipe 152, or the flow of water or sewage within the pipe 152. The sensor 156 may be a chemical sensor used to detect a chemical within any fluid that passes within the pipe 152.

Figure 5:
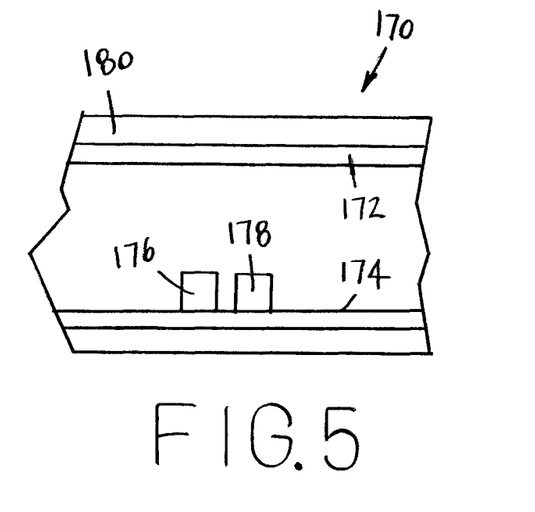
FIG. 5 is a partial enlarged schematic block diagram of another embodiment of a cured in place pipe system having a sensor constructed according to the present disclosure.

Referring now to FIG. 5, a partial enlarged schematic block diagram of another embodiment of a cured in place pipe system having a sensor 170 constructed according to the present disclosure is depicted. The system 170 comprises a cured in place pipe or liner 172 having a seam 174 and a first sensor 176 being incorporated into the seam 174 and a second sensor 178 being incorporated into the seam 174. The pipe 172 is adjacent to a main or drain pipe 180. This ensures that any fluid or sewage that passes by the sensors 176 and 178 will be detected or sensed. In this particular system and by way of example only, the first sensor 176 may be a level sensing device and the second sensor 178 may be a flow meter. It is also possible that either the second sensor 178 may be a camera. It is also possible that the first sensor 176 and the second sensor 178 may be either types of sensors.

Figure 6:
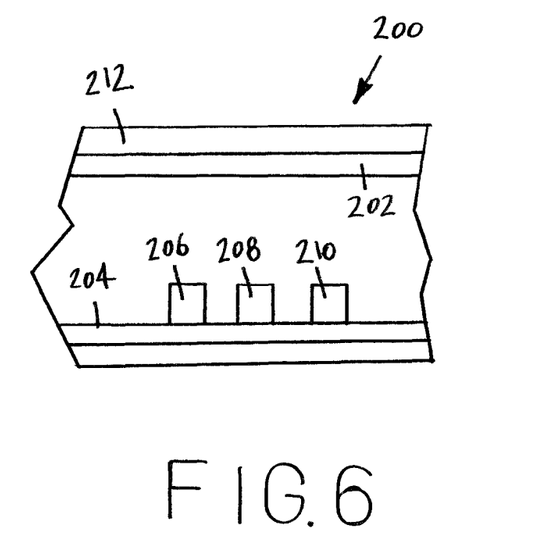
FIG. 6 is a partial enlarged schematic block diagram of another embodiment of a cured in place pipe system having a sensor constructed according to the present disclosure.

FIG. 6 illustrates a partial enlarged schematic block diagram of another embodiment of a cured in place pipe system having a sensor 200 constructed according to the present disclosure. The system 200 comprises a cured in place pipe or liner 202 having a seam 204 and a first sensor 206, a second sensor 208, and a third sensor 210 with the sensors 206, 208, and 210 being incorporated into the seam 204. The pipe 202 is adjacent to a main or drain pipe 212. This ensures that any fluid or sewage that passes by the sensors 206, 208, and 210 will be detected. By way of example, the first sensor 206 may be a level sensor, the second sensor 208 may be a camera, and the third sensor 210 may be a flow meter.

Figure 7:
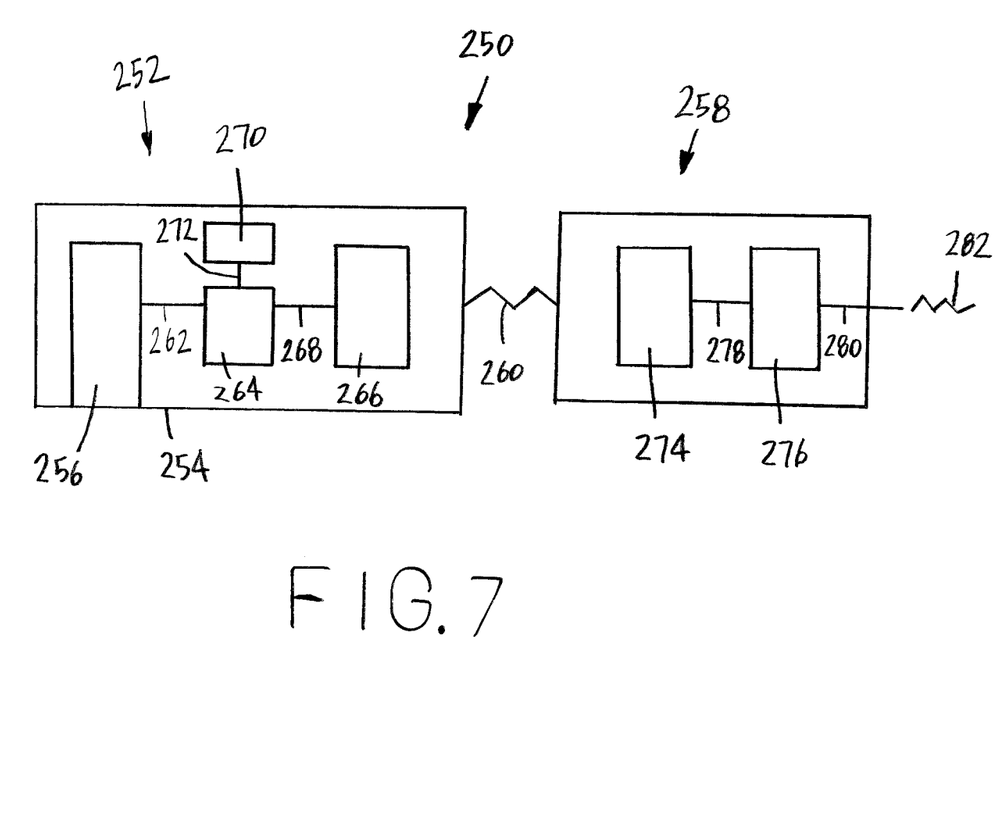
FIG. 7 is a schematic block diagram of the cured in place pipe system having a sensor constructed according to the present disclosure.

With particular reference now to FIG. 7 illustrates a block diagram of another embodiment of a cured in place pipe system having a sensor 250 constructed according to the present disclosure. The system 250 comprises a cured in place pipe or liner 252 having a seam 254 and a sensor 256 being incorporated into the seam 254 which is capable of communicating with a communications device 258 via a signal 260. The sensor 256 is connected via a link 262 to a control circuit 264 with the control circuit 264 being connected to a transmitter device 266 over a connection 268. The control circuit 264 is connected to an energy source, such as a battery 270, by a connection 272. The transmitter device 266 is capable of generating and sending the signal 260 to the communications device 258. The communications device 258 comprises a receiver 274 that is connected to a transmitter 276 by a connection 278. The receiver 274 has an antenna 280 that is capable of sending a signal 282 over a network (not shown) to a cell phone, a smart phone, a paging device, or a building automation system. The system 250 is capable of sending the signal 282 to alert personnel of a condition within the pipe 252. By way of example only and not limiting in any sense, the following components or devices may be used in constructing the system 250. The control circuit 264 and the transmitter device 266 may be a single chip or circuit such as that manufactured by Microchip Technology, Inc. of Chandler, Arizona, such as part number PIC12F529T48A. This chip is a microcontroller having an integrated radio frequency transmitter. The receiver 274 may be an rfRXD0420 Receiver Module also manufactured by Microchip Technology, Inc.

Figure 8:
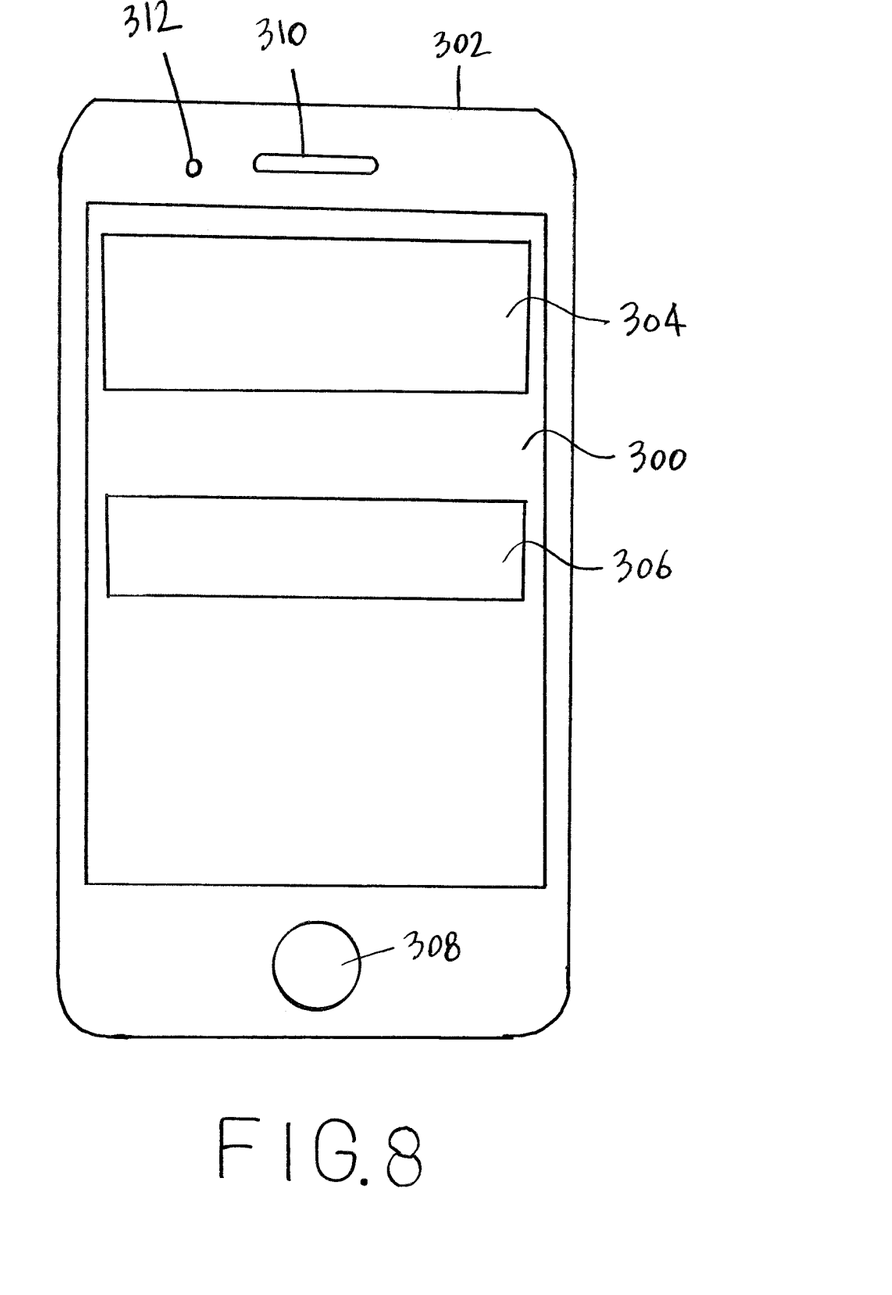
FIG. 8 is an illustration of a screen of a mobile communication device which may be presented during use of the cured in place pipe system having a sensor constructed according to the present disclosure.

FIG. 8 is an illustration of a screen 300 of a mobile communication device, such as a smart phone 302. The smart phone 302 may include a mobile software platform such as iPhone OS (Operating System), Android OS, Palm WebOS, Windows Mobile, or other similar mobile software platform that is capable of running a software program such as an application. The screen 300 has a box 304 in which a real time video of a condition detected within the pipe 46 (FIG. 2) may be displayed. The application running on the phone 302 may include information in the box 304 such as the locations of the houses 40 and 42 (FIG. 2) where the system 48 is installed. In particular, there may be numerous system 48 installed at numerous drain pipe or main pipe locations. For example, a school system may have ten different schools located at ten different addresses. Each of the systems 48 may have a unique code associated with its respective system 48. The unique code may be part of a signal sent by a particular system 48. The software resident in the smart phone 302 may be programmed to show the specific location of the system 48 and this information may be displayed in the box 304. Another box 306 may be provided in the screen 300 that may include contact information of a person located at the site where the system 48 is installed so that an operator of the phone 302 may contact the person to take action at the location of the system 48, such as the first house 40 (FIG. 2). The screen 300 may include other boxes or icons which are touch sensitive. The phone 302 may include other items such as a menu button 308, a speaker 310, and a visual indicator 312.

Figure 9:
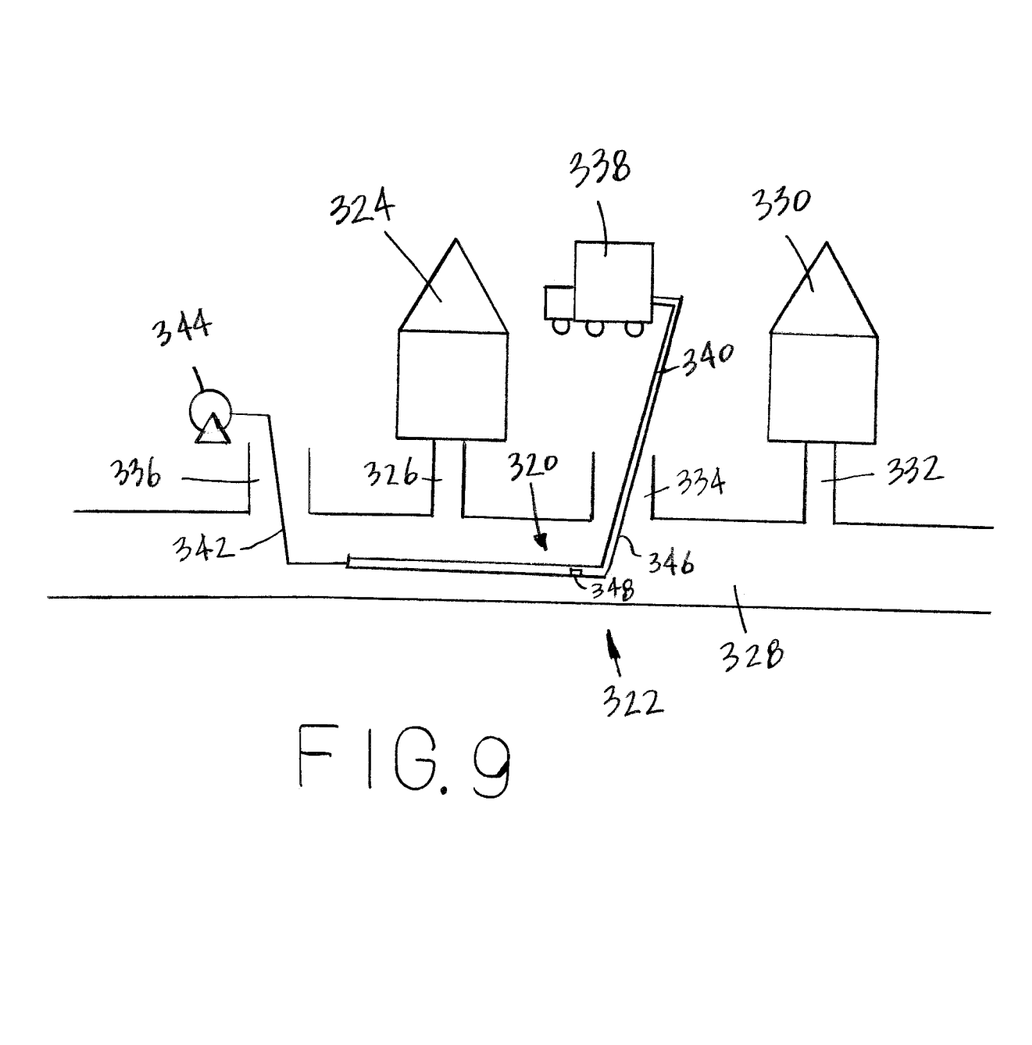
FIG. 9 is a schematic block diagram of another embodiment of a cured in place pipe system having a sensor of the process of the cured in place pipe system having a sensor being installed in a sewage system.

With reference now to FIG. 9, another embodiment of a cured in place pipe system having a sensor 320 being installed in a sewage system 322 is shown. The sewage system 322 has a first house 324 having a first drain pipe 326 connected to a main pipe 328 of the sewage system 322. A second house 330 has a second drain pipe 332 also connected to the main pipe 328. A first manhole or access shaft 334 is located between the first house 324 and the second house 330. A second manhole or access shaft 336 is positioned after the first house 324. A truck 338 has a liner 340 connected to a pull wire 342 that is connected to a winch 344. The liner 340 may be stored within the truck 338 until the liner 340 is ready to be installed in the sewage system 322. The winch 344 is used to pull the pull wire 342 and the liner 340 into position within the sewage system 322. The liner 340 is pulled from the truck 338 through the first manhole 334 into position within the main pipe 328. The liner 340 also has a seam 346 in which a sensor 348 is positioned. Once the sensor 348 is at a desired position within the main pipe 328 between the first house 324 and the second house 330, the liner 340 may be cured by any appropriate method so that the liner 340 hardens and is against the main pipe 328. Once in place, a communications device (not shown) such as the communications device 258 (FIG. 7) may be positioned or installed on a manhole cover (not shown). As should be appreciated, the system 320 may be installed in either or both of the drain pipes 326 and 332. Once installed, the system 320 is capable of monitoring a condition within the main pipe 328.

Figure 10:
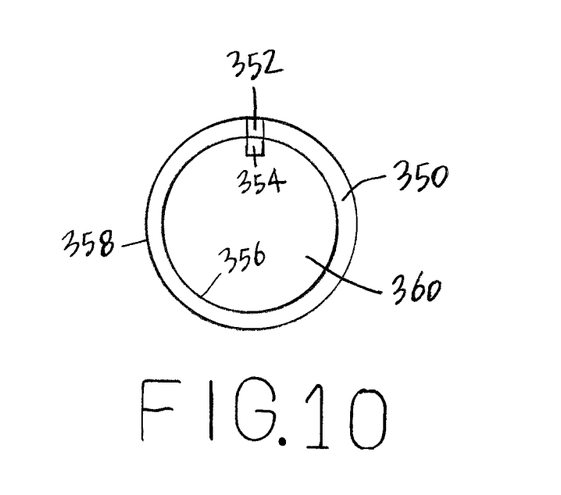
FIG. 10 is a cross-sectional view of a cured in place pipe having a sensor constructed according to the present disclosure.

FIG. 10 depicts a cross-sectional view of a cured in place pipe or liner 350 having a sensor 352. The cured in place pipe 350 has a seam 354 in which the sensor 352 is positioned. The pipe 350 may be constructed of various materials such as, by way of example only, woven fiberglass, felt, cloth, or synthetic material. The seam 354 may be a welded seam. The pipe 350 has an interior surface 356 and an exterior surface 358 and an interior 360 in which sewage, water, air, or liquid may flow. The exterior surface 358 is used to abut against a damaged or undamaged pipe (not shown). Although not shown, the pipe 350 may be saturated with an uncured thermoset material or resin that may be cured by use of a heat source, a light source, or steam. By way of example only, the sensor 352 may be a submersible level sensing transmitter device, a camera, a flow meter, a chemical sensor, or any other sensing used to monitor a condition within the pipe 350.

Figure 11:
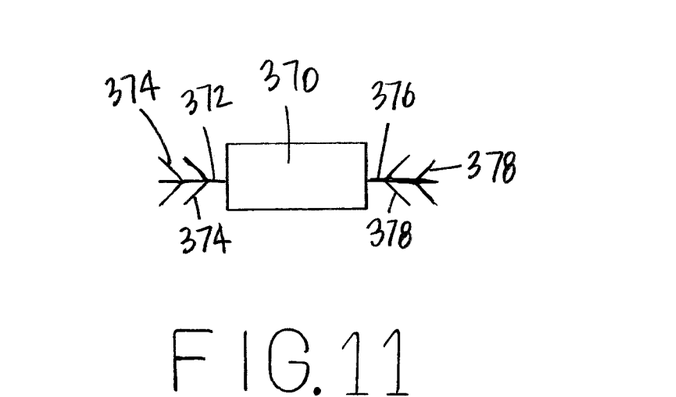
FIG. 11 is a top view of a sensor for use with a cured in place pipe constructed according to the present disclosure.

With reference now to FIG. 11, a sensor 370 is illustrated for use with, for example, the pipe 350 (FIG. 10). The sensor 370 has a first extension portion 372 having one or more barbs 374. The sensor 370 also has a second extension portion 376 having one or more barbs 378. The barbs 374 or 378 may be used to secure and position the sensor 370 to the seam 354 of the pipe 350.

From all that has been said, it will be clear that there has thus been shown and described herein a cured in place pipe system having a sensor which fulfills the various objects and advantages sought therefor. It will be apparent to those skilled in the art, however, that many changes, modifications, variations, and other uses and applications of the subject cured in place pipe system having a sensor are possible and contemplated. All changes, modifications, variations, and other uses and applications which do not depart from the spirit and scope of the disclosure are deemed to be covered by the disclosure, which is limited only by the claims which follow.

What is claimed is:

1. A cured in place pipe system having a sensor comprising:
   a cured in place pipe having a seam;
   a sensor incorporated into the seam, the sensor for transmitting a signal indicative of a condition within the cured in place pipe, the sensor having a barb; and
   a communications device positioned remote from the sensor and capable of receiving the signal from the sensor.

2. The cured in place pipe system having a sensor of claim 1 wherein the sensor is a level sensing sensor.

3. The cured in place pipe system having a sensor of claim 1 wherein the sensor is a camera.

4. The cured in place pipe system having a sensor of claim 1 wherein the sensor is a flow meter.

5. The cured in place pipe system having a sensor of claim 1 wherein the communications device is capable of sending a signal indicative of the condition within the cured in place pipe.

6. The cured in place pipe system having a sensor of claim 1 wherein the communications device is capable of transmitting a signal indicative of the condition within the cured in place pipe to another communications device.

7. A cured in place pipe system having a sensor comprising:
   a cured in place pipe having a seam;
   a first sensor incorporated into the seam, the first sensor for transmitting a first signal indicative of a first condition within the cured in place pipe, the first sensor having a first extension portion having a barb;
   a second sensor incorporated into the seam, the second sensor for transmitting a second signal indicative of a second condition within the cured in place pipe; and a communications device positioned remote from the sensor and capable of receiving the first signal from the first sensor and the second signal from the second sensor.

8. The cured in place pipe system having a sensor of claim 7 wherein the first sensor is a level sensing sensor.

9. The cured in place pipe system having a sensor of claim 7 wherein the first sensor is a camera.

10. The cured in place pipe system having a sensor of claim 7 wherein the first sensor is a flow meter.

11. The cured in place pipe system having a sensor of claim 7 wherein the second sensor is a level sensing sensor.

12. The cured in place pipe system having a sensor of claim 7 wherein the second sensor is a camera.

13. The cured in place pipe system having a sensor of claim 7 wherein the second sensor is a flow meter.

14. A cured in place pipe system having a sensor comprising:

a cured in place pipe having a seam;

a sensor positioned along the seam, the sensor for transmitting a signal indicative of a condition within the cured in place pipe, the sensor having a first extension portion having a barb to secure the sensor to the seam; and a communications device positioned remote from the sensor and capable of receiving the signal from the sensor.

15. The cured in place pipe system having a sensor of claim 14 wherein the sensor is a level sensing sensor.

16. The cured in place pipe system having a sensor of claim 14 wherein the sensor is a camera.

17. The cured in place pipe system having a sensor of claim 14 wherein the sensor is a chemical sensor.

18. The cured in place pipe system having a sensor of claim 14 wherein the sensor is a flow meter.

19. The cured in place pipe system having a sensor of claim 14 wherein the communications device is capable of sending a signal indicative of the condition within the cured in place pipe.

20. The cured in place pipe system having a sensor of claim 14 wherein the communications device is capable of transmitting a signal indicative of the condition within the cured in place pipe to another communications device.

* * * * *